US010930302B2

(12) United States Patent
Breedvelt-Schouten et al.

(10) Patent No.: US 10,930,302 B2
(45) Date of Patent: Feb. 23, 2021

(54) QUALITY OF TEXT ANALYTICS

(71) Applicant: International Business Machines Corporation, Armonk, NY (US)

(72) Inventors: Ilse Breedvelt-Schouten, Manotick (CA); Sasa Matijevic, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 15/853,482

(22) Filed: Dec. 22, 2017

(65) Prior Publication Data
US 2019/0198039 A1 Jun. 27, 2019

(51) Int. Cl.
| | |
|---|---|
| *G10L 21/00* | (2013.01) |
| *G10L 25/63* | (2013.01) |
| *G06F 3/16* | (2006.01) |
| *G06F 16/683* | (2019.01) |
| *G06F 40/10* | (2020.01) |
| *G06F 40/103* | (2020.01) |
| *G06F 40/117* | (2020.01) |

(52) U.S. Cl.
CPC ............ *G10L 25/63* (2013.01); *G06F 3/16* (2013.01); *G06F 16/685* (2019.01); *G06F 40/10* (2020.01); *G06F 40/103* (2020.01); *G06F 40/117* (2020.01)

(58) Field of Classification Search
CPC ......... G10L 21/00; G10L 19/00; G10L 13/00; G10L 17/21
USPC .... 704/235, 270, 260, 275, 2, 258; 434/157; 715/203; 726/28
See application file for complete search history.

(56) References Cited

U.S. PATENT DOCUMENTS 5,555,343 A * 9/1996 Luther ............... G06F 3/16
704/258
8,792,818 B1 7/2014 Colebank et al.
(Continued)

FOREIGN PATENT DOCUMENTS

EP 1788538 A1 10/2006

OTHER PUBLICATIONS

Chen, L., et al., "Speaker and expression factorization for audiobook data: expressiveness and transplantation," IEEE Transactions on Audio, Speech, and Language Processing, vol. 23, No. 4, 2015, pp. 605-618.

(Continued)

*Primary Examiner* — Michael Colucci
(74) *Attorney, Agent, or Firm* — Cuenot, Forsythe & Kim, LLC

(57) ABSTRACT

Text can be presented with speech indicators generated by a cognitive system by processing the text. The speech indicators can indicate recommended speech characteristics to be exhibited by a user while the user generates spoken utterances representing the text. Data indicating at least one user input changing at least one of the speech indicators from a first state as originally presented to a second state can be received. In response, a value indicating a level of change made to the at least one of the speech indicators can be determined. At least one parameter used by the cognitive system to select the speech indicators can be modified or created based on the value indicating the level of change made to the at least one of the speech indicators.

20 Claims, 8 Drawing Sheets

(56) References Cited

U.S. PATENT DOCUMENTS

| | | | | |
|---|---|---|---|---|
| 8,898,063 | B1* | 11/2014 | Sykes | G10L 15/26 704/270 |
| 8,954,328 | B2 | 2/2015 | Kurzweil et al. | |
| 9,075,760 | B2 | 7/2015 | Hwang | |
| 9,240,187 | B2 | 1/2016 | Torok et al. | |
| 9,335,819 | B1* | 5/2016 | Jaeger | G06F 3/013 |
| 9,697,820 | B2 | 7/2017 | Jeon | |
| 9,830,636 | B1* | 11/2017 | Story, Jr. | G06Q 30/0631 |
| 10,192,569 | B1* | 1/2019 | Indyk | H04M 3/5183 |
| 10,453,442 | B2 | 10/2019 | Chandra et al. | |
| 2001/0053975 | A1* | 12/2001 | Kurihara | G10L 13/00 704/260 |
| 2002/0110248 | A1* | 8/2002 | Kovales | G10L 13/00 381/56 |
| 2005/0289459 | A1* | 12/2005 | Walton | G09B 5/06 715/201 |
| 2008/0005656 | A1* | 1/2008 | Pang | G09B 5/062 715/203 |
| 2009/0254345 | A1* | 10/2009 | Fleizach | G10L 19/018 704/260 |
| 2009/0326948 | A1* | 12/2009 | Agarwal | G10L 13/033 704/260 |
| 2013/0110513 | A1 | 5/2013 | Jhunja et al. | |
| 2013/0216995 | A1* | 8/2013 | Yoon | G06Q 10/063 434/365 |
| 2014/0007257 | A1* | 1/2014 | Dougherty | G09B 5/062 726/28 |
| 2014/0067397 | A1 | 3/2014 | Radebaugh | |
| 2014/0272820 | A1* | 9/2014 | Wride | G09B 5/04 434/157 |
| 2015/0120278 | A1* | 4/2015 | Waibel | G06F 40/58 704/2 |
| 2016/0027431 | A1* | 1/2016 | Kurzweil | G09B 5/062 715/203 |
| 2017/0017838 | A1* | 1/2017 | Biswas | G06K 9/00302 |
| 2018/0067902 | A1* | 3/2018 | Nelson | G10L 13/043 |
| 2018/0113854 | A1* | 4/2018 | Vig | G10L 25/48 |
| 2019/0196675 | A1* | 6/2019 | German | G06K 9/00463 |

OTHER PUBLICATIONS

Xu, X. et al., "The expression of emotions by text and speech," In 2014 9th Int'l. Sym. on Chinese Spoken Language Processing (ISCSLP), IEEE, Sep. 2014, pp. 353-353.

"Mariner Software," [online] Mariner Software, Inc. © 2017 [retrieved Dec. 22, 2017] retrieved from the Internet: <http://marinersoftware.com/products/narrator/>, 7 pg.

Audiobook Industry Surveys Show Growth [online] Independent Publisher, Jenkins Group Publishing Services, [retrieved Dec. 22, 2017] retrieved from the Internet: <http://independentpublisher.com/article.php?page=1611>, 4 pg.

Jaffe, E., "Your Brain on Audio Books: Distracted, Forgetful, and Bored," [online] Fast Company & Inc. © 2017 Mansueto Ventures, LLC, Feb. 12, 2014, retrieved from the Internet: <https://www.fastcodesign.com/3026224/your-brain-on-audio-books-distracted-forgefful-and-bored>, 4 pg.

"Watson Document Conversion," [online] IBM Watson, Products and Services [retrieved Dec. 22, 2017], retrieved from the Internet: <https://www.ibm.com/watson/services/document-conversion/>, 4 pg.

"AlchemyLanguage," [online] IBM © 2017, IBM Watson Developer Cloud, [retrieved Dec. 22, 2017], retrieved from the Internet: <https://www.ibm.com/watson/developercloud/alchemy-language.html>, 5 pg.

"Watson Tone Analyzer," [online] IBM Watson Products and Services, [retrieved Dec. 22, 2017], retrieved from the Internet: <https://www.ibm.com/watson/services/tone-analyzer/>, 6 pg.

"Watson Personality Insights," [online] IBM Watson Products and Services, [retrieved Dec. 22, 2017], retrieved from the Internet: https://www.ibm.com/watson/services/personality-insights/>, 6 pg.

* cited by examiner

QUALITY OF TEXT ANALYTICS

BACKGROUND

The present invention relates to data processing systems, and more specifically, to text analytics.

An audiobook is a recording of a narrator's spoken utterances while reading aloud the text of a book. An audiobook can be an exact word-for-word version of the book or an abridged version of the book. The audience can listen to audiobooks on a wide variety of devices, for example smart phones, tablet computers, desktop computers, home entertainment systems, automotive entertainment systems, etc. In this regard, audio books sometimes are available in a variety of audio mediums, for instance digital audio formats (e.g., downloadable digital audio files, compact discs, etc.) and analog audio formats (e.g., cassette tapes).

SUMMARY

A method includes presenting text with speech indicators, the speech indicators generated by a cognitive system by processing the text, and the speech indicators indicating recommended speech characteristics to be exhibited by a user while the user generates spoken utterances representing the text. The method also can include receiving data indicating at least one user input changing at least one of the speech indicators from a first state as originally presented to a second state. The method also can include, responsive to receiving the data indicating the at least one user input changing the at least one of the speech indicators from the first state as originally presented to the second state, determining a value indicating a level of change made to the at least one of the speech indicators. The method also can include modifying or creating, using a processor, at least one parameter used by the cognitive system to select the speech indicators based on the value indicating the level of change made to the at least one of the speech indicators.

A system includes a processor programmed to initiate executable operations. The executable operations include presenting text with speech indicators, the speech indicators generated by a cognitive system by processing the text, and the speech indicators indicating recommended speech characteristics to be exhibited by a user while the user generates spoken utterances representing the text. The executable operations also can include receiving data indicating at least one user input changing at least one of the speech indicators from a first state as originally presented to a second state. The executable operations also can include, responsive to receiving the data indicating the at least one user input changing the at least one of the speech indicators from the first state as originally presented to the second state, determining a value indicating a level of change made to the at least one of the speech indicators. The executable operations also can include modifying or creating at least one parameter used by the cognitive system to select the speech indicators based on the value indicating the level of change made to the at least one of the speech indicators.

A computer program includes a computer readable storage medium having program code stored thereon. The program code is executable by a processor to perform a method. The method includes presenting, by the processor, text with speech indicators, the speech indicators generated by a cognitive system by processing the text, and the speech indicators indicating recommended speech characteristics to be exhibited by a user while the user generates spoken utterances representing the text. The method also can include receiving, by the processor, data indicating at least one user input changing at least one of the speech indicators from a first state as originally presented to a second state. The method also can include, responsive to receiving the data indicating the at least one user input changing the at least one of the speech indicators from the first state as originally presented to the second state, determining, by the processor, a value indicating a level of change made to the at least one of the speech indicators. The method also can include modifying or creating, by the processor, at least one parameter used by the cognitive system to select the speech indicators based on the value indicating the level of change made to the at least one of the speech indicators.

DETAILED DESCRIPTION

Figure 1:
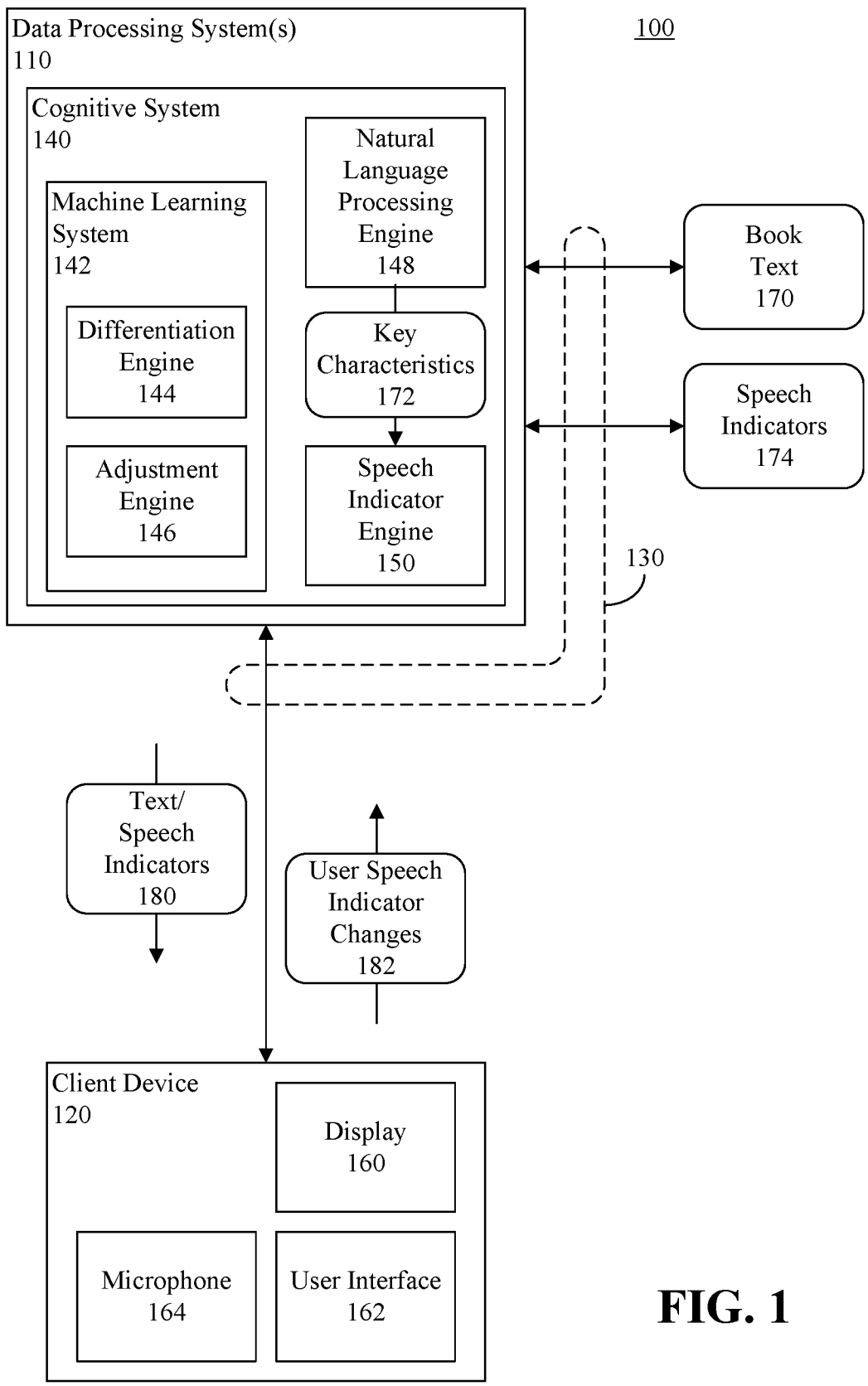
FIG. 1 is a block diagram illustrating an example of a computing environment.

This disclosure relates to data processing systems, and more specifically, to text analytics. In accordance with the inventive arrangements disclosed herein, text can be presented with speech indicators generated by a cognitive system by processing the text. The speech indicators can indicate recommended speech characteristics to be exhibited by a user while the user generates spoken utterances representing the text. Data indicating user inputs changing the speech indicators can be received. In response, values indicating levels of change made to the speech indicators can be determined. Parameters used by the cognitive system to select the speech indicators can be modified or created based on the values indicating the levels of change made to the speech indicators.

The parameters that are created and/or modified can be used by the cognitive system to analyze particular traits/tones of text when selecting speech indicators to present, not only with the present text, but also with other text. Accordingly, the performance (e.g., accuracy) of the cognitive system to select speech indicators for text will improve because of using the created and/or modified parameters. The level of improvement will increase over time as additional user feedback is received for various texts processed by the cognitive system.

Several definitions that apply throughout this document now will be presented.

As defined herein, the term "audiobook" means an audio recording of a user's spoken utterances while the user reads text of a book. The user can be, for example, a narrator.

As defined herein, the term "speech indicator" means an indicator indicating recommended speech characteristics to be exhibited by a user while the user generates spoken utterances representing text, for example text of a book.

As defined herein, the term "cognitive system" means an artificial intelligence (AI) system that implements machine learning and natural language processing to extract meaningful insights from data.

As defined herein, the term "natural language" is a language spoken and/or written by human beings that is not a computer programming language.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a computing environment 100. The computing environment can include at least one data processing system 110 and at least one client device 120 communicatively linked via at least one communication network 130. The communication network 130 is the medium used to provide communications links between various devices and data processing systems connected together within the computing environment 100. The communication network 130 may include connections, such as wire, wireless communication links, or fiber optic cables. The communication network 130 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

The data processing system(s) 110 can host a cognitive system 140. An example of the cognitive system 140 is IBM® Watson™, though the present arrangements are not limited to this example. The cognitive system 140 can include a machine learning system 142, which can include a differentiation engine 144 and an adjustment engine 146. Further, the cognitive system 140 can include a natural language processing engine 148 and a speech indicator engine 150.

The client device 120 can include a display 160 configured to present a user interface 162. The user interface 162 can be communicated from the cognitive system 140 to the client device 120 for presentation by the display 160 (e.g., using a web browser or other application executing on the client device 120), or the user interface 162 can be provided by another application (e.g., an audiobook narration application) hosted by the client device 120 that is communicatively linked to the cognitive system 140. The client device 120 also can include a microphone 164 or other suitable input audio transducer configured to detect utterances spoken by the user, which can be recorded by the client device 120 and/or the cognitive system 140.

Operation of the various components 140-164 are described with respect to the various flowcharts and diagrams that follow.

Figure 2:
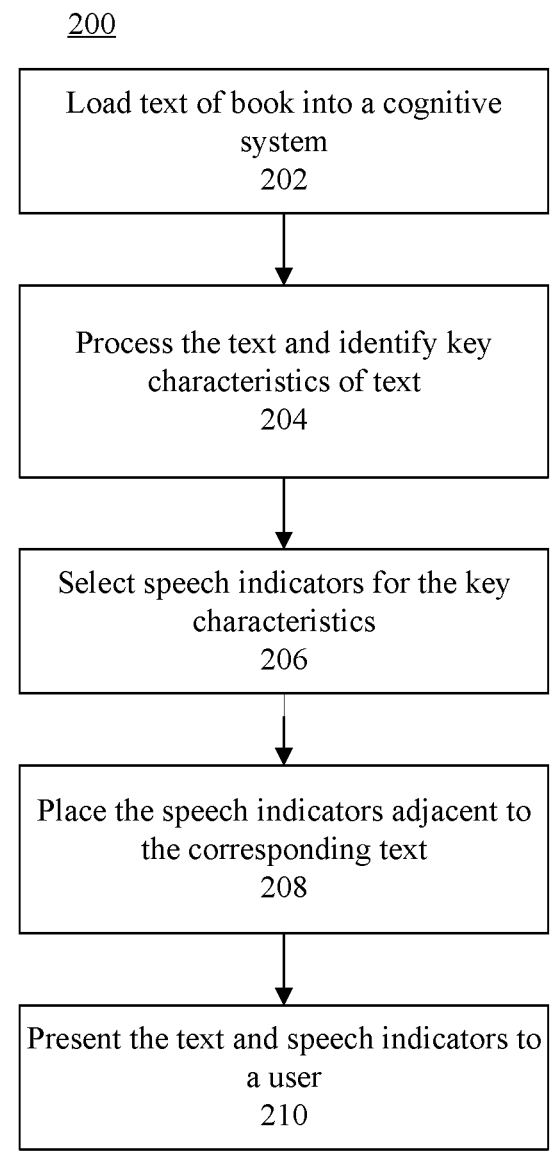
FIG. 2 is a flow chart illustrating an example of a method of generating speech indicators for text to be narrated, and presenting the text and speech indicators to a user.

FIG. 2 is a flow chart illustrating an example of a method 200 of generating speech indicators for text to be narrated, and presenting the text and speech indicators to a user. Referring to FIGS. 1 and 2, at step 202 of the method 200, the cognitive system 140 can access text 170 of a book to be narrated, and load the text 170 of the book into the cognitive system 140. In this regard, the text 170 can be written in a natural language. Optionally, the cognitive system 140 also can load other content, for example images, etc., into the cognitive system 140. In one arrangement, the cognitive system 140 can access the text 170 and, optionally, the other content from a functional data structure, for example a database, to which the data processing system(s) 110 is/are communicatively linked via the communication network 130. In another arrangement, the cognitive system 140 can access the text 170 and, optionally, the other content from local storage of the data processing system(s) 110.

At step 204, the cognitive system 140 can process the text 170 and identify key characteristics 172 of various portions of the text 170. The key characteristics 172 can include, for example, indicators of characters (e.g., people or fictional people) discussed in the text 170, indicators of tones of language used in the text, indicators of emotions presented in the text, indicators of locations discussed in the text, etc. The indicators of the characters can indicate genders of the characters, aspects of personality and/or emotional characteristics of the characters, etc.

In illustration, the natural language processing engine 148 can perform natural language processing (NLP) and semantic analysis on the text 170 to identify the key characteristics 172. NLP is a field of computer science, artificial intelligence and linguistics which implements computer processes to facilitate interactions between computer systems and human (natural) languages. NLP enables computers to derive computer-understandable meaning from natural language input and identify key characteristics of the natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the natural language processing engine 148 to implement NLP and semantic analysis on the text 170.

At step 206, the cognitive system 140 can select speech indicators 174 for the identified key characteristics 172 of the various portions of the text 170. The speech indicators 174 can include, for example, images representing characters (e.g., people or fictional people) discussed in the text 170, images representing locations discussed in the text 170, tone indicators indicating tones to use when generating spoken utterances representing a vocalization of the text 170 (e.g., reading the text 170 aloud), emotion indicators indicating emotions to express when generating spoken utterances representing the text 170, mood indicators indicating a mood to express when generating spoken utterances representing the text 170, pace indicators indicating a pace at which to speak when generating spoken utterances representing the text 170, volume indicators indicating a volume at which to speak when generating spoken utterances representing the text 170, and so on. The tone indicators, emotion indicators, mood indicators, pace indicators and volume indicators can be, for example, specific colors, specific symbols, specific strings of symbols, specific icons, specific emoticons, etc.

In illustration, the natural language processing engine 148 can communicate the key characteristics 172 to the speech indicator engine 150, and the speech indicator engine 150 can identify speech indicators 174 that correspond to the key characteristics 172. In one arrangement, the speech indicator engine 150 can access the speech indicators 174 from a functional data structure, for example a database, to which the data processing system(s) 110 is/are communicatively linked via the communication network 130. In another arrangement, the speech indicator engine 150 can access the speech indicators 174 from local storage of the data processing system(s) 110.

Figure 3:
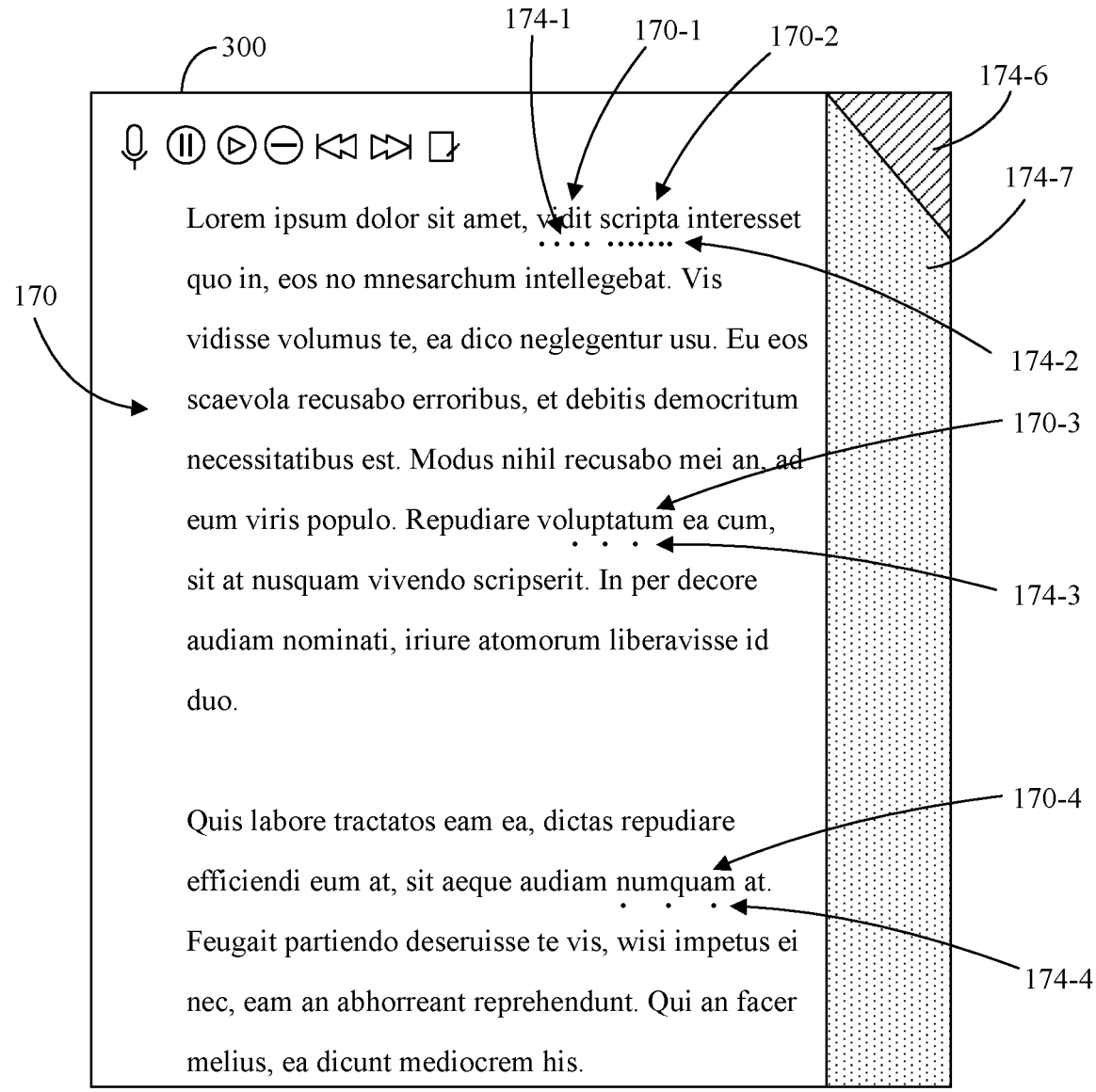
FIG. 3 is an example view presenting text of an audiobook with added speech indicators.

At step 208, the cognitive system 140 can place the selected speech indicators 174 adjacent to the portions of the text 170 for which the speech indicators 174 were selected. At step 210, the cognitive system 140 can present the text 170 and selected speech indicators 174 to a user on the display 160 via the user interface 162, for example as depicted in FIG. 3. In illustration, the cognitive system 140 can communicate text/speech indicators 180 to the client device 120.

FIG. 3 is an example view 300 presenting the text 170 of the audiobook with the added speech indicators 174, which can be contained in the text/speech indicators 180 communicated to the client device 120. Referring to FIGS. 1 and 3, the user interface 162 can present the view 300 on the display 160. In this example, the speech indicators 174 can include speech indicators 174-1, 174-2, 174-3, 174-4, which can indicate to the user a recommendation of a speed and emphasis to be used when uttering the text 170-1, 170-2, 170-3 170-4 (e.g., words and/or phrases) to which the speech indicators 174-1, 174-2, 174-3, 174-4 are adjacent, respectively. The speech indicators 174-1, 174-2, 174-3, 174-4 can be, for instance, a series of symbols (e.g., dots), with the density of the symbols indicating a recommended pace of speech. In illustration, symbols spaced far apart can indicate a recommended slow pace of speech while symbols spaced closely together can indicate a recommended fast pace of speech. The user interface 162 can present the speech indicators 174-1, 174-2, 174-3, 174-4, for example, below or above the respective text 170-1, 170-2, 170-3 170-4 to which the speech indicators 174-1, 174-2, 174-3, 174-4 correspond.

Further, the speech indicators 174 can include speech indicators 174-6, 174-7, which indicate to the user a recommendation of a mood to reflect when reading aloud the text 170. The speech indicators 174-6, 174-7 can be presented, for instance, as particular colors, emoticons, etc., and can be presented adjacent to the text 170 to which they apply. In illustration, the speech indicator 174-6 can be presented to the right of the text 170 at the top of the view 300 to indicate a somber mood for text 170 at the top of the page, and the indicator 174-7 can be presented to the right of the text 170, from the top of the view 300 to the bottom of the view 300, to indicate a happier mood for the remaining text 170 on the page. There may be some overlap or transition from the speech indicator 174-6 to the speech indicator 174-7, for example to indicate a transition from a somber mood to a happy mood in the text 170, which is recommended to be reflected in the spoken utterances.

Figure 4:
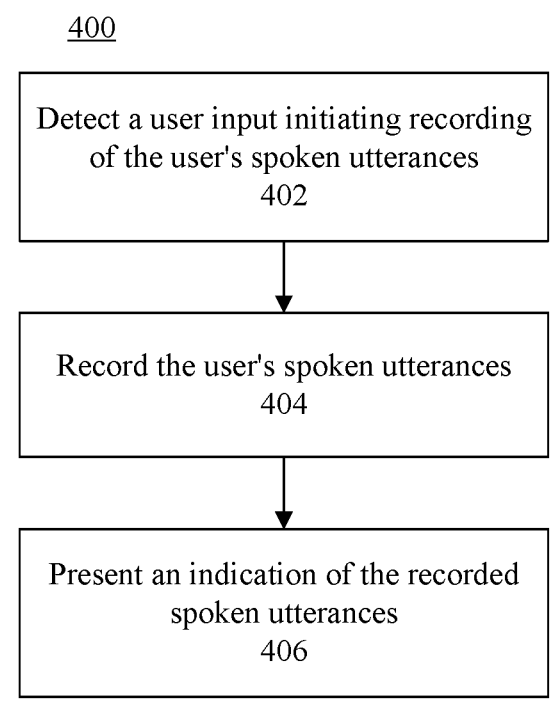
FIG. 4 is a flow chart illustrating an example of a method of receiving spoken utterances from a user representing vocalization of text.
Figure 5:
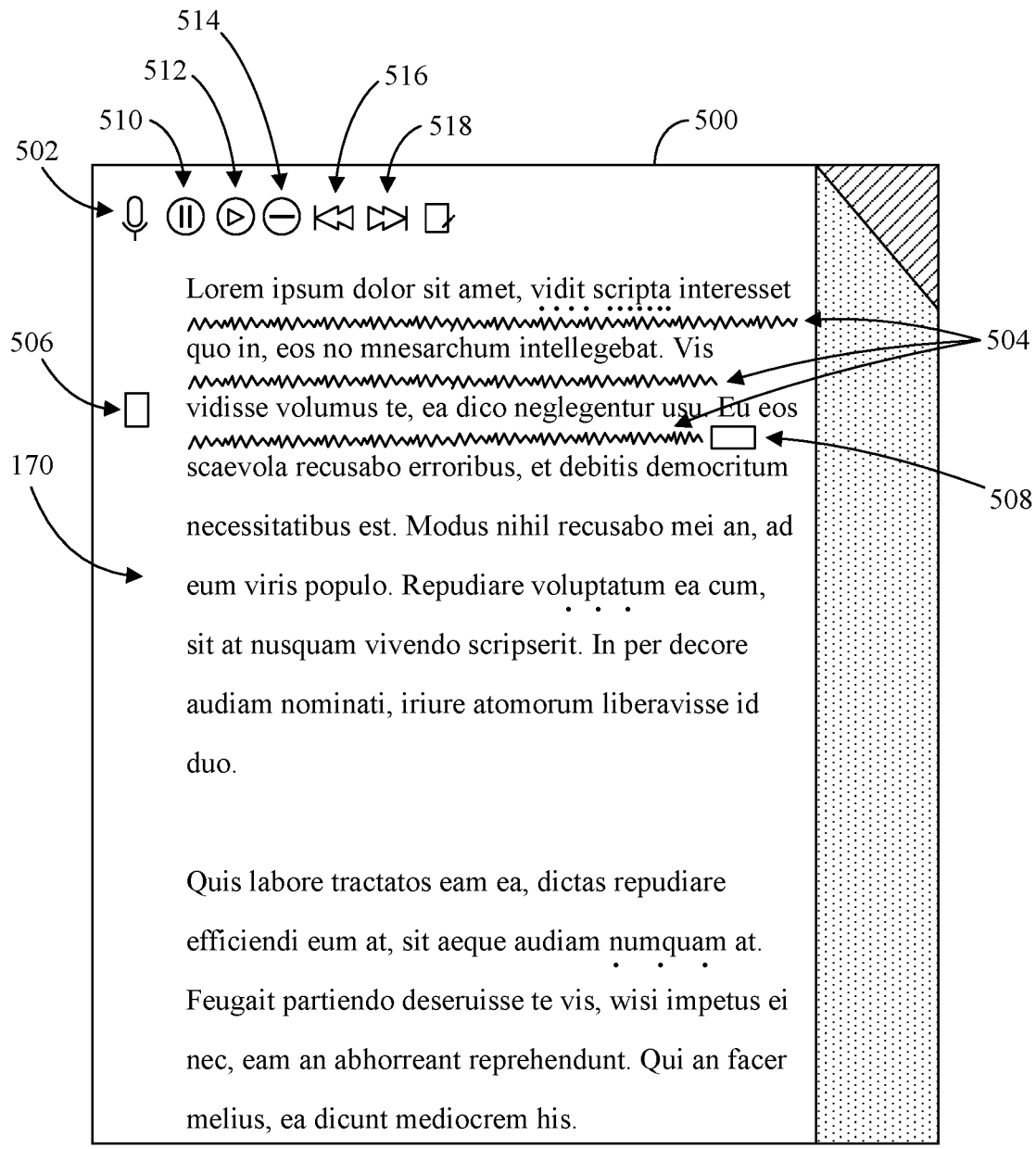
FIG. 5 is an example view presenting audio waveforms of a voice recording.

FIG. 4 is a flow chart illustrating an example of a method 400 of receiving spoken utterances from the user representing vocalization of the text 170. FIG. 5 is an example view 500 presenting audio waveforms 504 of a voice recording. Referring to FIGS. 1 and 5, the user interface 162 can present the view 500 on the display 160.

Referring to FIGS. 1, 4 and 5, at step 402 of the method 400, the user interface 162 can detect a user input initiating recording of the user's spoken utterances. In illustration, the user can select a user interface element 502 (e.g., button, icon, menu item, etc.) presented by the user interface 162 to initiate the recording. At step 404, the user interface 162 can record the spoken utterances using the microphone 164, for instance while the user reads aloud the text 170 presented in the view 500. By way of example, in an arrangement in which the user interface 162 is provided to the client device 120 by the cognitive system 140, the user interface 162 can communicate the spoken utterances to the cognitive system 140, in real time, while the spoken utterances are recorded. In an arrangement in which the user interface 162 is provided by an application hosted on the client device 120, the user interface 162 can communicate the spoken utterances to such application, in real time, while the spoken utterances are recorded. The application hosted on the client device 120 can communicate the recording to the cognitive system 140 in real time, responsive to a user input, at time intervals, or in response to any other determined event.

At step 406, the user interface 162 can present an indication of the recorded spoken utterances in the view 500. For example, as the user reads aloud the text 170, the user interface 162 can present audio waveforms 504 representing the waveforms of the recorded spoken utterances. The user interface 162 can present the audio waveforms adjacent to the specific portions of the text 170 to which the audio waveforms 504 correspond, for example below or above the specific portions of text 170. Accordingly, as the user reads aloud the text 170, the user can monitor the recording of the user's spoken utterances by viewing the audio waveforms 504. Further, the user interface 162 can present an indicator 506 indicating a line of the text 170 which the user is reading aloud, or up to which the user has read aloud, and an indicator 508 indicating up to where the on the line of text 170 the user has read aloud.

At any time the user can pause the recording, for example by again selecting the user interface element 502 or selecting a user interface element 510. The user also can play back the recording of the user's spoken utterances by selecting a user interface element 512. The user can select a portion of text 170, or a portion of the audio waveforms 504 corresponding to a portion of text 170, and select a user interface element 514 to delete the recording of spoken utterances for that portion of text. The user can select a user interface element 516 to navigate to a previous page of text 170 or a user interface element 518 to navigate to a following page of text 170.

Figure 6:
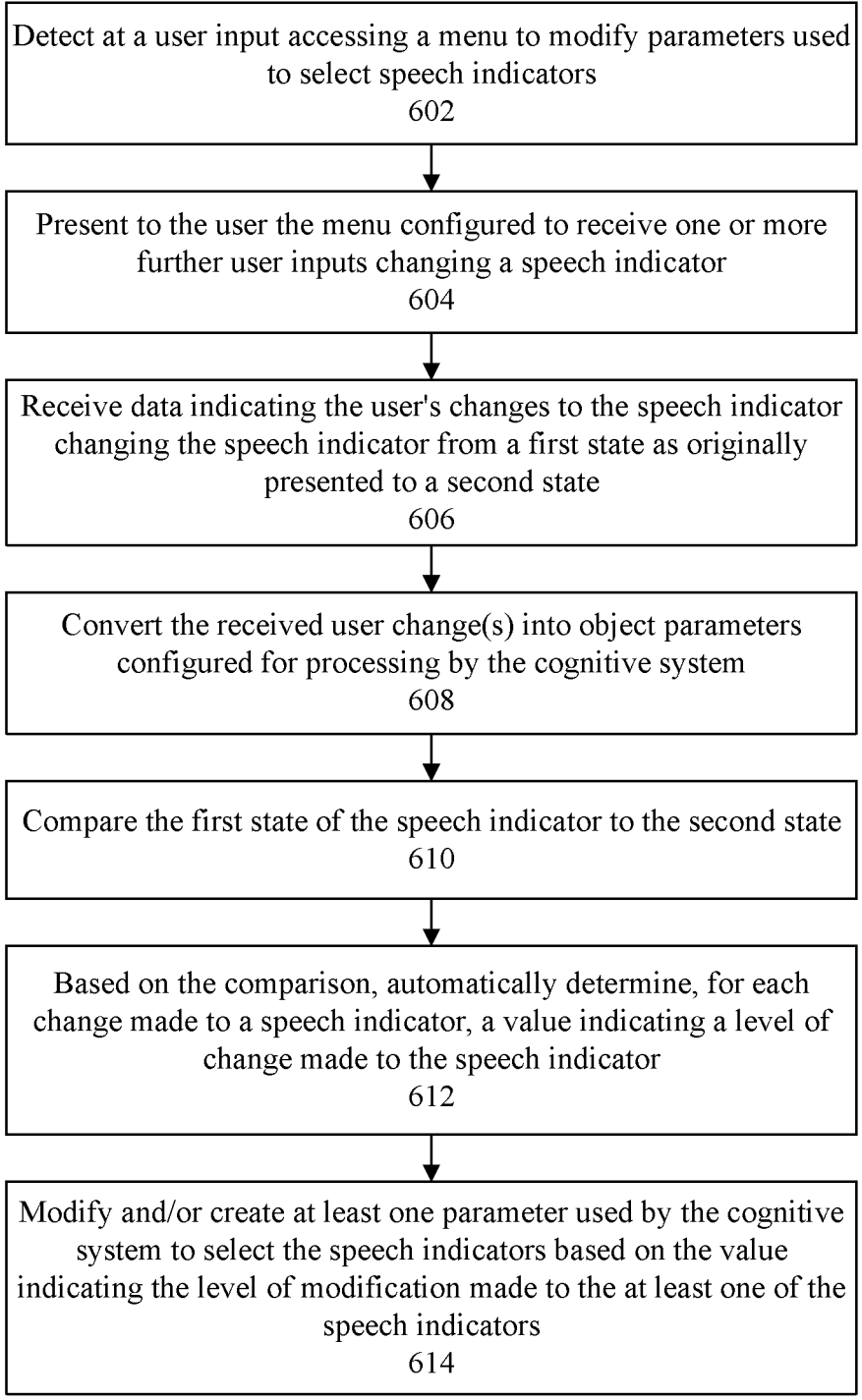
FIG. 6 is a flow chart illustrating an example of a method of modifying parameters used by a cognitive system to select speech indicators.
Figure 7:
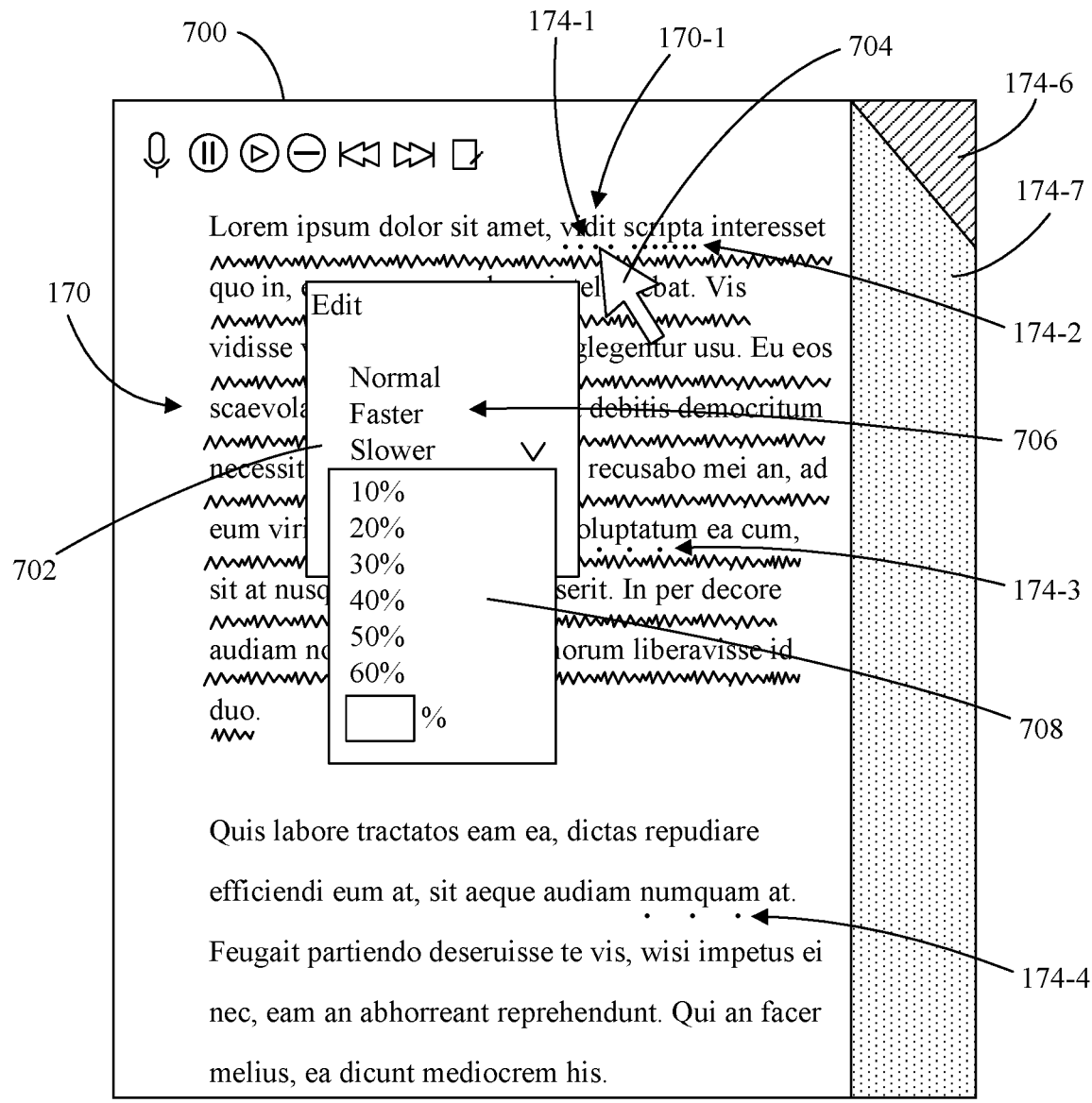
FIG. 7 is an example view presenting a menu for receiving user inputs related to the speech indicators.

FIG. 6 is a flow chart illustrating an example of a method 600 of modifying parameters used by the cognitive system 140 to select the speech indicators 174. FIG. 7 is an example view 700 presenting a menu 702 for receiving user inputs related to the speech indicators 174. Referring to FIGS. 1 and 7, the user interface 162 can present the view 700 on the display 160.

Referring to FIGS. 1, 6 and 7, at step 602 of the method 600, the user interface 162 can detect a user input accessing the menu 702 to modify parameters used by the cognitive system 140 to select speech indicators 174. In illustration, assume that the user does not agree with the speech indicator 174-1. For example, the speech indicator may recommend a certain pace of speech in which to utter the word 170-1, and the user may believe that the recommended pace is incorrect or otherwise not appropriate for the context of the text 170 in which the word 170-1 is presented. Using a cursor 704, the user can select the speech indicator 174-1, for example by hovering the cursor 704 over the speech indicator 174-1 and entering a user input into a mouse, trackpad or other pointing device.

In response to detecting the user input, at step 604 the user interface 162 can present to the user the menu 702, which can be configured to receive one or more further user inputs changing at least one of the speech indicators 174. The menu 702 can, for example, present one or more menu items 706 the user can select to change the selected speech indicator 174-1. The user can enter a user input selecting one or more of the menu items 706 to change the speech indicator 174-1, for example to change the speech indicator to indicate a normal pace of speech, to change the speech indicator to indicate a faster pace speech, to change the speech indicator to indicate a slower pace speech, to change the speech indicator to indicate a higher tone of speech, to change the speech indicator to indicate a lower tone of speech, etc. In the case of faster, slower, higher, lower, etc., the user interface 162 can present a sub-menu from which the user can specify a percentage or value for the change. In illustration, if the user selects a "slower" menu item 706 from the menu 702, the user interface 162 can present a sub-menu 708 from which the user can select a percentage or value, or enter a percentage or value, which to change the speech indicator 174-1. The user input(s) can change the speech indicator 174-1 from a first state, as originally presented, to a second state as determined by the user input.

The user interface 162 can detect the user's input(s) changing the speech indicator 174-1 from the first state as originally presented to the second state via the menu 702/ sub-menu 708. In response, the user interface 162 can communicate corresponding data to the cognitive system 140, for example as user speech indicator changes 182 (FIG. 1). At step 606, the cognitive system 140 can receive the user speech indicator changes 182 (i.e., the data indicating the at least one user input changing at least one of the speech indicators 174 from the first state as originally presented to the second state). At this point it should be noted that the user also can change one or more of the speech indicators 174-2, 174-3, 174-4, 174-6, 174-7 in a similar manner, and the cognitive system 140 can receive the user speech indicator changes 182 to those speech indicators 174-2, 174-3, 174-4, 174-6, 174-7 as well.

At step 608, the cognitive system 140 can convert the received user speech indicator changes 182 to at least one object parameter configured for processing by the cognitive system 140 (i.e., that the cognitive system 140 understands). For example, if the user changes the pace of recommended utterance to 60% of the present indicated value, the cognitive system 140 can convert that percentage into an object parameter representing the change and which the cognitive system 140 may further process. In another example, if the user changes a mood indicator from a level 3 to a level 5, the cognitive system 140 can convert the change from level 3 to level 5 into an object parameter representing the change and which the cognitive system 140 may further process.

At step 610, the differentiation engine 144 can compare the first state of the speech indicator(s) to the second state(s). At step 612, based on such comparison, the differentiation engine 144 can automatically determine, for each change made to a speech indicator 174, a value indicating a level of change made to the speech indicator 174. For instance, the differentiation engine 144 can determine a change difference between the first state of the originally presented speech indicator 174-1 and the second state of the speech indicator resulting from the user's changes to the speech indicator 174-1. In this regard, determining the value indicating the level of change made to the at least one of the speech indicators as described for step 612 can be responsive to receiving the data indicating the at least one user input changing the at least one of the speech indicators from the first state as originally presented to the second state described at step 606, though intervening processes described at steps 608 and 610 may take place.

At step 614, the adjustment engine 146 can modify and/or create at least one parameter used by the cognitive system 140 to select the speech indicators 174 based on the value indicating the level of modification made to the at least one of the speech indicators 174. In illustration, the adjustment engine 146 can modify and/or create parameters used to analyze particular traits/tones of text (including, but not limited to, the text 170) when selecting speech indicators 174 to present with the text. Accordingly, the performance (e.g., accuracy) of the cognitive system 140 at selecting speech indicators 174 for text will be improved. The level of improvement will increase over time as additional user feedback is received for various texts processed by the cognitive system 140.

In one aspect of the present arrangements, the cognitive system 140 can include a plurality of different services used to select speech indicators 174. For instance, in the case that the cognitive system 140 is IBM® Watson™, the cognitive system 140 can use Watson Personality Insights and Watson Tone Analyzer to contribute to the speech indicator 174 selection process. The adjustment engine 146 can modify and/or create parameters used by those services for the processes performed by those services that contribute to the speech indicator 174 selection process.

Figure 8:
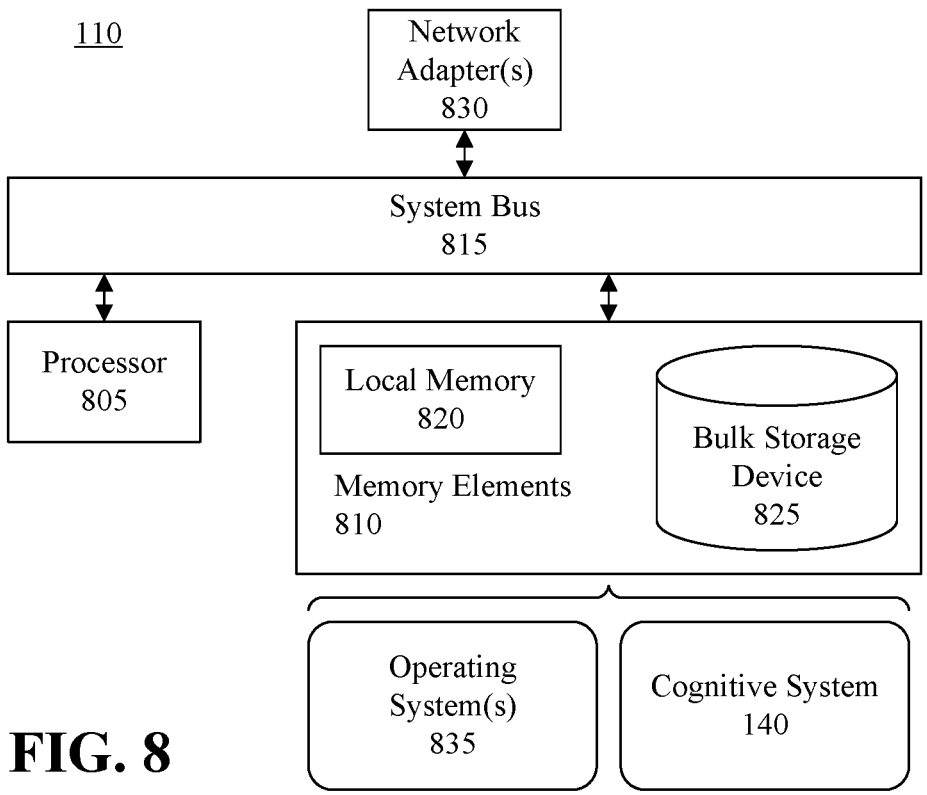
FIG. 8 is a block diagram illustrating an example of an architecture for a data processing system.

FIG. 8 is a block diagram illustrating an example of an architecture for the data processing system(s) 110 of FIG. 1. The data processing system(s) 110 can include at least one processor 805 (e.g., a central processing unit) coupled to memory elements 810 through a system bus 815 or other suitable circuitry. As such, the data processing system(s) 110 can store program code within the memory elements 810. The processor 805 can execute the program code accessed from the memory elements 810 via the system bus 815. It should be appreciated that the data processing system(s) 110 can be implemented in the form of any system including a processor and memory that is capable of performing the functions and/or operations described within this specification. For example, the data processing system(s) 110 can be implemented as a server, a plurality of communicatively linked servers, and so on.

The memory elements 810 can include one or more physical memory devices such as, for example, local memory 820 and one or more bulk storage devices 825. Local memory 820 refers to random access memory (RAM) or other non-persistent memory device(s) generally used during actual execution of the program code. The bulk storage device(s) 825 can be implemented as a hard disk drive (HDD), solid state drive (SSD), or other persistent data storage device. The data processing system(s) 110 also can include one or more cache memories (not shown) that provide temporary storage of at least some program code in order to reduce the number of times program code must be retrieved from the bulk storage device 825 during execution.

One or more network adapters 830 also can be coupled to data processing system(s) 110 to enable the data processing system(s) 110 to become coupled to other systems, client devices, computer systems, remote printers, and/or remote storage devices through intervening private or public networks. Modems, cable modems, transceivers, and Ethernet cards are examples of different types of network adapters 830 that can be used with the data processing system(s) 110.

As pictured in FIG. 8, the memory elements 810 can store the components of data processing system(s) 110, namely at least one operating system 945 and the cognitive system 140. Being implemented in the form of executable program code, these components of the operating system(s) 835 and cognitive system 140 can be executed by the data processing system(s) 110 and, as such, can be considered part of the data processing system(s) 110. Moreover, the operating system(s) 835 and cognitive system 140 are functional data structures that impart functionality when employed as part of the data processing system(s) 110.

Figure 9:
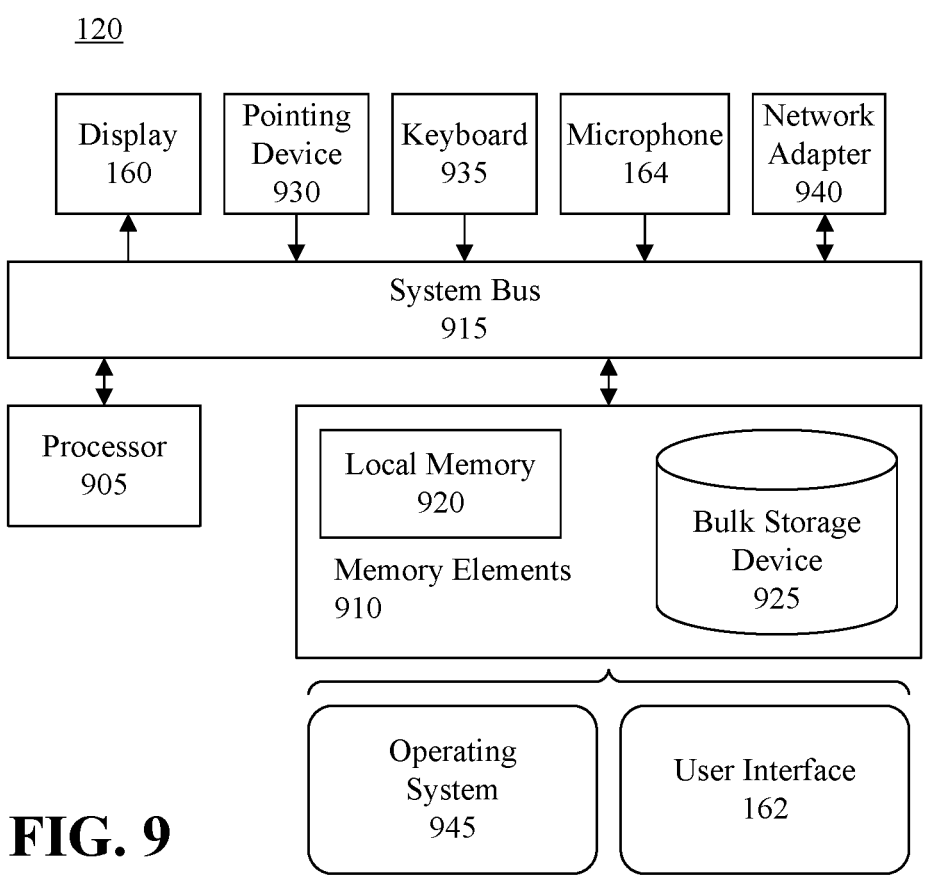
FIG. 9 is a block diagram illustrating an example of an architecture for a client device.

FIG. 9 is a block diagram illustrating an example of an architecture for the client device 120 of FIG. 1. The client device 120 can include at least one processor 905 (e.g., a central processing unit) coupled to memory elements 910 through a system bus 915 or other suitable circuitry. As such, the client device 120 can store program code within the memory elements 910. The processor 905 can execute the program code accessed from the memory elements 910 via the system bus 915. It should be appreciated that the client device 120 can be implemented in the form of any system including a processor and memory that is capable of performing the functions and/or operations described within this specification as being performed by the client device 120.

The memory elements 910 can include one or more physical memory devices such as, for example, local memory 920 and one or more bulk storage devices 925. The client device 120 also can include one or more cache memories (not shown) that provide temporary storage of at least some program code in order to reduce the number of times program code must be retrieved from the bulk storage device 925 during execution.

Input/output (I/O) devices such as the display 160, a pointing device 930 a keyboard 935 (optionally) and the microphone 164 (or other suitable input audio transducer) can be coupled to the client device 120. The I/O devices can be coupled to the client device 120 either directly or through intervening I/O controllers. For example, the display 160 can be coupled to the client device 120 via a graphics processing unit (GPU), which may be a component of the processor 905 or a discrete device. The microphone 164 can be coupled to the client device 120 via an audio controller. At least one network adapter 940 also can be coupled to client device 120 to enable the client device 120 to become coupled to other systems, including the data processing system(s) 110. Modems, cable modems, transceivers, and Ethernet cards are examples of different types of network adapters 940 that can be used with the client device 120.

As pictured in FIG. 9, the memory elements 910 can store the components of the client device 120, namely an operating system 945 and, optionally, the user interface 162. Being implemented in the form of executable program code, these components of the client device 120 can be executed by the client device 120 and, as such, can be considered part of the client device 120. Moreover, the operating system 945 and user interface 162 are functional data structures that impart functionality when employed as part of the client device 120.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    presenting text with speech indicators, the speech indicators generated by a cognitive system by processing the text, and the speech indicators indicating recommended speech characteristics to be exhibited by a user while the user generates spoken utterances representing the text, wherein the speech indicators display one or more symbols with variation correlated to the speech characteristics to be exhibited by the user, wherein one or more symbols may correspond to the same type of characteristic;
    receiving data indicating at least one user input changing at least one of the speech indicators from a first state as originally presented to a second state;
    responsive to receiving the data indicating the at least one user input changing the at least one of the speech indicators from the first state as originally presented to the second state, determining a value indicating a level of change made to the at least one of the speech indicators; and
    modifying or creating, using a processor, at least one parameter used by the cognitive system to select the speech indicators based on the value indicating the level of change made to the at least one of the speech indicators.

2. The method of claim 1, further comprising:
    comparing the first state of the speech indicator to the second state;
    wherein the determining the value indicating the level of change made to the at least one of the speech indicators is based on the comparing the first state of the speech indicator to the second state.

3. The method of claim 1, further comprising:
    converting to at least one object parameter configured for processing by the cognitive system the data indicating the at least one user input changing the at least one of the speech indicators from the first state as originally presented to the second state.

4. The method of claim 1, further comprising:
    presenting to the user a menu configured to receive at least one user input changing the at least one of the speech indicators, wherein the data indicating at least one user input changing the at least one of the speech indicators from the first state as originally presented to the second state is received via the menu.

5. The method of claim 1, wherein the speech indicators indicating the recommended speech characteristics to be exhibited by the user while the user generates the spoken utterances representing the text includes at least one pace indicator indicating a pace at which to speak when generating the spoken utterances.

6. The method of claim 1, wherein the speech indicators indicating the recommended speech characteristics to be exhibited by the user while the user generates the spoken utterances representing the text includes at least one tone indicator indicating a tone to use when generating the spoken utterances.

7. The method of claim 1, wherein the speech indicators indicating the recommended speech characteristics to be exhibited by the user while the user generates the spoken utterances representing the text includes at least one emotion indicator indicating an emotion to express when generating the spoken utterances.

8. A system, comprising:
    a processor programmed to initiate executable operations comprising:
    presenting text with speech indicators, the speech indicators generated by a cognitive system by processing the text, and the speech indicators indicating recommended speech characteristics to be exhibited by a user while the user generates spoken utterances representing the text, wherein the speech indicators display one or more symbols with variation correlated to the speech characteristics to be exhibited by the user, wherein one or more symbols may correspond to the same type of characteristic;
    receiving data indicating at least one user input changing at least one of the speech indicators from a first state as originally presented to a second state;
    responsive to receiving the data indicating the at least one user input changing the at least one of the speech indicators from the first state as originally presented to the second state, determining a value indicating a level of change made to the at least one of the speech indicators; and
    modifying or creating at least one parameter used by the cognitive system to select the speech indicators based on the value indicating the level of change made to the at least one of the speech indicators.

9. The system of claim 8, the executable operations further comprising:
    comparing the first state of the speech indicator to the second state;
    wherein the determining the value indicating the level of change made to the at least one of the speech indicators is based on the comparing the first state of the speech indicator to the second state.

10. The system of claim 8, the executable operations further comprising:

converting to at least one object parameter configured for processing by the cognitive system the data indicating the at least one user input changing the at least one of the speech indicators from the first state as originally presented to the second state.

11. The system of claim 8, the executable operations further comprising:

presenting to the user a menu configured to receive at least one user input changing the at least one of the speech indicators, wherein the data indicating at least one user input changing the at least one of the speech indicators from the first state as originally presented to the second state is received via the menu.

12. The system of claim 8, wherein the speech indicators indicating the recommended speech characteristics to be exhibited by the user while the user generates the spoken utterances representing the text includes at least one pace indicator indicating a pace at which to speak when generating the spoken utterances.

13. The system of claim 8, wherein the speech indicators indicating the recommended speech characteristics to be exhibited by the user while the user generates the spoken utterances representing the text includes at least one tone indicator indicating a tone to use when generating the spoken utterances.

14. The system of claim 8, wherein the speech indicators indicating the recommended speech characteristics to be exhibited by the user while the user generates the spoken utterances representing the text includes at least one emotion indicator indicating an emotion to express when generating the spoken utterances.

15. A computer program product comprising a computer readable storage medium having program code stored thereon, the program code executable by a processor to perform a method comprising:

presenting, by the processor, text with speech indicators, the speech indicators generated by a cognitive system by processing the text, and the speech indicators indicating recommended speech characteristics to be exhibited by a user while the user generates spoken utterances representing the text, wherein the speech indicators display one or more symbols with variation correlated to the speech characteristics to be exhibited by the user, wherein one or more symbols may correspond to the same type of characteristic;

receiving, by the processor, data indicating at least one user input changing at least one of the speech indicators from a first state as originally presented to a second state;

responsive to receiving the data indicating the at least one user input changing the at least one of the speech indicators from the first state as originally presented to the second state, determining, by the processor, a value indicating a level of change made to the at least one of the speech indicators; and modifying or creating, by the processor, at least one parameter used by the cognitive system to select the speech indicators based on the value indicating the level of change made to the at least one of the speech indicators.

16. The computer program product of claim 15, the method further comprising:

comparing the first state of the speech indicator to the second state;

wherein the determining the value indicating the level of change made to the at least one of the speech indicators is based on the comparing the first state of the speech indicator to the second state.

17. The computer program product of claim 15, the method further comprising:

converting to at least one object parameter configured for processing by the cognitive system the data indicating the at least one user input changing the at least one of the speech indicators from the first state as originally presented to the second state.

18. The computer program product of claim 15, the method further comprising:

presenting to the user a menu configured to receive at least one user input changing the at least one of the speech indicators, wherein the data indicating at least one user input changing the at least one of the speech indicators from the first state as originally presented to the second state is received via the menu.

19. The computer program product of claim 15, wherein the speech indicators indicating the recommended speech characteristics to be exhibited by the user while the user generates the spoken utterances representing the text includes at least one pace indicator indicating a pace at which to speak when generating the spoken utterances.

20. The computer program product of claim 15, wherein the speech indicators indicating the recommended speech characteristics to be exhibited by the user while the user generates the spoken utterances representing the text includes at least one tone indicator indicating a tone to use when generating the spoken utterances or at least one emotion indicator indicating an emotion to express when generating the spoken utterances.

* * * * *